US011163814B2

(12) United States Patent
Duplessis et al.

(10) Patent No.: US 11,163,814 B2
(45) Date of Patent: Nov. 2, 2021

(54) SYSTEMS AND METHODS TO AUTONOMOUSLY ADD GEOLOCATION INFORMATION TO MEDIA OBJECTS

(71) Applicant: MYLIO, LLC, Bellevue, WA (US)

(72) Inventors: Jean-Pierre Duplessis, Kirkland, WA (US); Marcus Rein Donner, Seattle, WA (US); Samuel A. Mann, Bellevue, WA (US)

(73) Assignee: MYLIO, LLC, Bellevue, WA (US)

( * ) Notice: Subject to any disclaimer, the term of this patent is extended or adjusted under 35 U.S.C. 154(b) by 192 days.

(21) Appl. No.: 16/606,159

(22) PCT Filed: Apr. 19, 2018

(86) PCT No.: PCT/US2018/028405
§ 371 (c)(1),
(2) Date: Oct. 17, 2019

(87) PCT Pub. No.: WO2018/195334
PCT Pub. Date: Oct. 25, 2018

(65) Prior Publication Data
US 2020/0125596 A1 Apr. 23, 2020

Related U.S. Application Data

(60) Provisional application No. 62/487,664, filed on Apr. 20, 2017.

(51) Int. Cl.
*G06F 16/55* (2019.01)
*G06F 16/41* (2019.01)
(Continued)

(52) U.S. Cl.
CPC .............. *G06F 16/41* (2019.01); *G06F 16/44* (2019.01); *G06F 16/487* (2019.01);
(Continued)

(58) Field of Classification Search
CPC ........ G06F 16/355; G06F 16/41; G06F 16/44; G06F 16/487; G06F 16/55; G06F 3/0482
See application file for complete search history.

(56) References Cited

U.S. PATENT DOCUMENTS

2006/0212142 A1* 9/2006 Madani ................ G06K 9/6254
700/49
2010/0076976 A1 3/2010 Sotirov et al.
(Continued)

FOREIGN PATENT DOCUMENTS

WO 2014134150 A1 9/2014

OTHER PUBLICATIONS

International Search Report and Written Opinion, dated Oct. 31, 2018, for International Application No. PCT/US2018/028405, 10 pages.

*Primary Examiner* — Robert W Beausoliel, Jr.
*Assistant Examiner* — Nirav K Khakhar
(74) *Attorney, Agent, or Firm* — Seed Intellectual Property Law Group LLP

(57) ABSTRACT

Systems and methods to generate clusters of media objects (e.g., photos) that are associated with geolocation information (e.g., GPS data, folder name, file name, other metadata) and without geolocation information so that the media objects in a media library without geolocation information can be given location data in an automated user approved system. An approval system of visual overlays on a graphical user interface (GUI) lets users approve the proposed geolocation clusters and approve or reject the geolocation proposals individually or as a group. The resulting approved clusters may then be tagged with geolocation information (e.g., GPS coordinates, city, state, country) and may then be automatically organized in a number of ways, including but not limited to, by location, on a calendar, on a map, etc.

38 Claims, 11 Drawing Sheets

(51) Int. Cl.
  *G06F 16/487*   (2019.01)
  *G06F 16/48*    (2019.01)
  *G06F 16/44*    (2019.01)
  *G06F 3/0482*   (2013.01)

(52) U.S. Cl.
  CPC ............ *G06F 16/489* (2019.01); *G06F 16/55*
          (2019.01); *G06F 3/0482* (2013.01)

(56) References Cited

U.S. PATENT DOCUMENTS

| | | | |
|---|---|---|---|
| 2010/0141795 A1 | 6/2010 | Kim et al. | |
| 2013/0110631 A1 | 5/2013 | Mitchell et al. | |
| 2014/0047386 A1* | 2/2014 | Lynch | G06F 16/48 |
| | | | 715/810 |
| 2014/0250126 A1* | 9/2014 | Baldwin | G06F 16/51 |
| | | | 707/737 |
| 2015/0031396 A1* | 1/2015 | Hartford | G06F 16/487 |
| | | | 455/456.3 |
| 2016/0299645 A1* | 10/2016 | Shan | H04L 51/32 |
| 2016/0314184 A1* | 10/2016 | Bendersky | G06F 16/35 |
| 2016/0357783 A1 | 12/2016 | Harris et al. | |
| 2017/0053017 A1* | 2/2017 | Geduldig | G06Q 50/01 |
| 2017/0337790 A1* | 11/2017 | Gordon-Carroll | |
| | | | G06F 16/9537 |
| 2018/0069918 A1* | 3/2018 | Forutanpour | G06F 16/58 |
| 2018/0349388 A1* | 12/2018 | Skiles | G06F 3/0482 |
| 2019/0258664 A1* | 8/2019 | Case | G06F 16/41 |
| 2019/0310999 A1* | 10/2019 | Vanacker | G06F 16/93 |

\* cited by examiner

SYSTEMS AND METHODS TO AUTONOMOUSLY ADD GEOLOCATION INFORMATION TO MEDIA OBJECTS

BACKGROUND

Technical Field

The present disclosure generally relates to replication, synchronization, grouping and/or presentation of data objects, such as photos, across multiple processor-based devices.

Description of the Related Art

End users often have data collections (e.g., photos, videos, music, documents) that are spread across multiple processor-based devices (e.g., phones, personal computers, laptops, gaming consoles, tablet devices, digital cameras, cloud storage, etc.) spanning multiple networks. As computing devices become more prevalent and widely used among the general population, the amount of data generated and utilized by such devices has rapidly increased.

Modern devices, while more powerful than ever, continue to be challenged in terms of their ability to store all of the information that users want on all of their various devices. For instance, digital photography has recently become extremely popular, and as a result, digital pictures may cause many devices to run into storage limits. Further, this storage problem is only getting worse because most portable devices are using more expensive and smaller storage solid-state memory devices, as opposed to magnetic storage devices.

Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Existing systems and/or data backup solutions enable a user to store backup information in a location and/or media separate from its original source. Thus, for example, data from a computing device can be backed up from a hard drive to external media such as a tape drive, an external hard drive, or the like. However, in an implementation of network-based backup and/or other solutions that can be utilized to provide physically remote locations for storing backup data, costs and complexity associated with transmission and restoration of user data between a user machine and a remote storage location can substantially limit the usefulness of a backup system. For example, in the case where backup data is stored at a remote network location, data associated with respective versions of an original copy of a file and/or system image can be transmitted to remote storage (e.g., cloud), where the respective versions can later be retrieved for restoration. However, storing all of a user's content in a remote storage can be prohibitively expensive (and bandwidth consuming) for content such as digital photos and videos.

Data replication is used to protect data from loss, to ensure continuity and to provide access to content on other devices (e.g., access to pictures taken on a mobile phone on a desktop computer) while keeping the total cost of ownership relatively low. Generally, data replication requires making copies of data from a source device to one or more target devices. Target devices can reside on the same network as the host device or can be remotely located on other networks or remote locations. Data replication may be performed for several reasons including device synchronization, disaster recovery planning, content distribution, backup consolidation, etc.

Safeguarding user data is of primary importance. Loss of data can result from electrical outages, device damage or theft, natural or human caused disasters such as floods, tornadoes, fires, and other such events that can cause physical loss of processor-based devices and/or loss of the data stored thereon.

Thus, users often want to have content (e.g., photos) on some or all of their multiple devices. Users also want their content to be backed up and protected, often to a remotely located device. In some instances, users may want only a portion of their content on some devices. Further, in some instances users may want alternative forms of content (e.g., lower resolution photos) on some of their devices. Current systems either require the user to perform a great deal of manual work or require all of the content to be stored in the cloud, which is very expensive and impractical for many users.

With the advancement in digital technology and storage capabilities, often users may have numerous (e.g., tens of thousands or more) of objects (e.g., photos, documents) stored across multiple devices (e.g., laptop, tablet, smartphone, digital camera, cloud). Organizing, viewing or otherwise consuming or manipulating such objects can quickly become time consuming and overwhelming tasks.

In view of the foregoing, it is desirable to implement automated organization and presentation techniques with improved efficiency, convenience and ease of use.

BRIEF SUMMARY

A method of operation for a data storage system to add geolocation information to a plurality of media objects may be summarized as including: storing, in at least one nontransitory processor-readable storage medium of the data storage system, a media library which may include a plurality of media objects, the plurality of media objects including at least one geotagged media object and at least one non-geotagged media object, wherein each geotagged media object is logically associated with geolocation information, and each non-geotagged media object is not logically associated with geolocation information; grouping, by at least one processor communicatively coupled to the at least one nontransitory processor-readable storage medium, at least some of the plurality of media objects in the media library into one or more clusters based at least in part on at least one clustering condition; and for each of the one or more clusters that includes at least one non-geotagged media object, logically associating, by the at least one processor, each of the non-geotagged media objects in the cluster with geolocation information in the at least one nontransitory processor-readable storage medium based at least in part on geolocation information that is logically associated with at least one geotagged media object in the cluster.

The at least one geotagged media object may be logically associated with information indicative of the capture location of the at least one geotagged media object, the information including at least one of global positioning system (GPS) data, metadata, keyword data, place name data, file name data, or folder name data. Grouping at least some of the plurality of media objects in the media library into one or more clusters based at least in part on at least one clustering condition may include grouping at least some of the plurality of media objects in the media library into one or more clusters based at least in part on a capture time of the media objects. Grouping at least some of the plurality of media objects in the media library into one or more clusters based at least in part on at least one clustering condition may include grouping at least some of the plurality of media objects in the media library into one or more clusters based at least in part on both a capture time of the media objects and geolocation information of at least one of the geotagged media objects. The method may further include: causing, by the at least one processor, at least one of the non-geotagged media objects and the geolocation information logically associated therewith to be presented via a user interface. The method may further include: receiving, by the at least one processor, at least one of: an approval of the logical association between the non-geotagged media object and the geolocation information; or a request for modification of the logical association between the non-geotagged media object and the geolocation information. The method may further include: responsive to receiving a request for modification of the logical association, modifying the logical association between the non-geotagged media object and the geolocation information in the at least one nontransitory processor-readable storage medium. The method may further include: simultaneously receiving, by the at least one processor, at least one of: an approval of the logical association between a plurality of the non-geotagged media objects and geolocation information; or a request for modification of the logical association between a plurality of the non-geotagged media objects and geolocation information. Logically associating each of the non-geotagged media objects with geolocation information in the at least one nontransitory processor-readable storage medium may include logically associating each of the non-geotagged media objects with geolocation information that is less precise than the geolocation information of at least one of the geotagged media objects. Logically associating each of the non-geotagged media objects with geolocation information in the at least one nontransitory processor-readable storage medium may include logically associating each of the non-geotagged media objects with geolocation information that is identical to the geolocation information of at least one of the geotagged media objects. Logically associating each of the non-geotagged media objects with geolocation information in the at least one nontransitory processor-readable storage medium may include logically associating each of the non-geotagged media objects with geolocation information indicative of a geographic region including at least one of a neighborhood, a city, a state, a multi-state region, a country or a continent. Logically associating each of the non-geotagged media objects with geolocation information in the at least one nontransitory processor-readable storage medium may include logically associating each of the non-geotagged media objects with hierarchical geolocation information in the at least one nontransitory processor-readable storage medium based at least in part on geolocation information that is logically associated with at least one geotagged media object in the cluster. The method may further include: causing, by the at least one processor, at least one of the one or more clusters to be presented via a user interface in descending levels of precision. The method may further include: receiving, by the at least one processor, at least one of: an approval of the logical association between a non-geotagged media object and geolocation information logically associated with the non-geotagged media object; or a request for modification of the logical association between a non-geotagged media object and geolocation information logically associated with the non-geotagged media object. Causing at least one of the one or more clusters to be presented via a user interface in descending levels of precision may include causing at least one of the one or more clusters to be presented in descending levels of precision including least two of: country, state, city, address, and global positioning system (GPS) coordinates. The method may further include: causing, by the at least one processor, at least one of the one or more clusters to be graphically presented via a user interface. Storing a media library which includes a plurality of media objects may include storing a media library which includes a plurality of media objects on at least two nontransitory processor-readable storage media associated with a respective at least two computing devices. Storing a media library which includes a plurality of media objects may include storing a media library which includes a plurality of media objects including one or more media object types selected from the group of media object types consisting of: image media objects, video media objects, and document media objects. The method may further include: for a cluster that does not include any geotagged media objects, causing a prompt to be provided via a user interface that receives a selection of a location for the cluster that does not include any geotagged media objects; and logically associating the selected location with the cluster in at least one nontransitory processor-readable storage medium. Causing a prompt to be provided via a user interface may include causing a prompt to be provided that presents at least one location for selection, the at least one location based at least in part on the location information of a media object in a cluster other than the cluster that does not include any geotagged media objects. Causing a prompt to be provided via a user interface may include causing a prompt to be provided that presents at least one location for selection, the at least one location based at least in part on the location information of at least one geotagged media object in a cluster proximate in time to the cluster that does not include any geotagged media objects.

A data storage system may be summarized as including: at least one nontransitory processor-readable storage medium which stores processor-executable instructions or data, and which stores a plurality of media objects, the plurality of media objects including at least one geotagged media object and at least one non-geotagged media object, wherein each geotagged media object is logically associated with geolocation information, and each non-geotagged media object is not logically associated with geolocation information; and at least one processor communicably coupled to the at least one nontransitory processor-readable medium, in operation the at least one processor: groups at least some of the plurality of media objects in the media library into one or more clusters based at least in part on at least one clustering condition; and for each of the one or more clusters that includes at least one non-geotagged media object, logically associates each of the non-geotagged media objects in the cluster with geolocation information in the at least one nontransitory processor-readable storage medium based at least in part on geolocation information that is logically associated with at least one geotagged media object in the cluster.

The at least one clustering condition may include a capture time of the media objects. The at least one clustering condition may include both a capture time of the media objects and geolocation information of at least one of the geotagged media objects. In operation the at least one processor: may cause at least one of the non-geotagged media objects and the geolocation information logically associated therewith to be presented via a user interface. In operation the at least one processor: may receive at least one of: an approval of the logical association between the non-geotagged media object and the geolocation information; or a request for modification of the logical association between the non-geotagged media object and the geolocation information. Responsive to receiving a request for modification of the logical association, the at least one processor: may modify the logical association between the non-geotagged media object and the geolocation information in the at least one nontransitory processor-readable storage medium. In operation the at least one processor: may simultaneously receive at least one of: an approval of the logical association between a plurality of the non-geotagged media objects and geolocation information; or a request for modification of the logical association between a plurality of the non-geotagged media objects and geolocation information. In operation the at least one processor: may logically associate each of the non-geotagged media objects with geolocation information that is less precise than the geolocation information of at least one of the geotagged media objects. In operation the at least one processor: may logically associate each of the non-geotagged media objects with geolocation information that is identical to the geolocation information of at least one of the geotagged media objects. In operation the at least one processor: may logically associate each of the non-geotagged media objects with geolocation information indicative of a geographic region including at least one of a neighborhood, a city, a county, a state, a multi-state region, a country or a continent. In operation the at least one processor: may logically associate each of the non-geotagged media objects with hierarchical geolocation information in the at least one nontransitory processor-readable storage medium based at least in part on geolocation information that is logically associated with at least one geotagged media object in the cluster. In operation the at least one processor: may cause at least one of the one or more clusters to be presented via a user interface in descending levels of precision. In operation the at least one processor: may receive at least one of: an approval of the logical association between a non-geotagged media object and geolocation information logically associated with the non-geotagged media object; or a request for modification of the logical association between a non-geotagged media object and geolocation information logically associated with the non-geotagged media object. In operation the at least one processor: may cause at least one of the one or more clusters to be presented in descending levels of precision including least two of: country, state, city, address, and global positioning system (GPS) coordinates. In operation the at least one processor: may cause at least one of the one or more clusters to be graphically presented via a user interface. The at least one nontransitory processor-readable storage medium which stores the plurality of media objects may include at least two nontransitory processor-readable storage media associated with a respective at least two computing devices. The plurality of media objects may include one or more media object types selected from the group of media object types consisting of: image media objects, video media objects, and document media objects.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
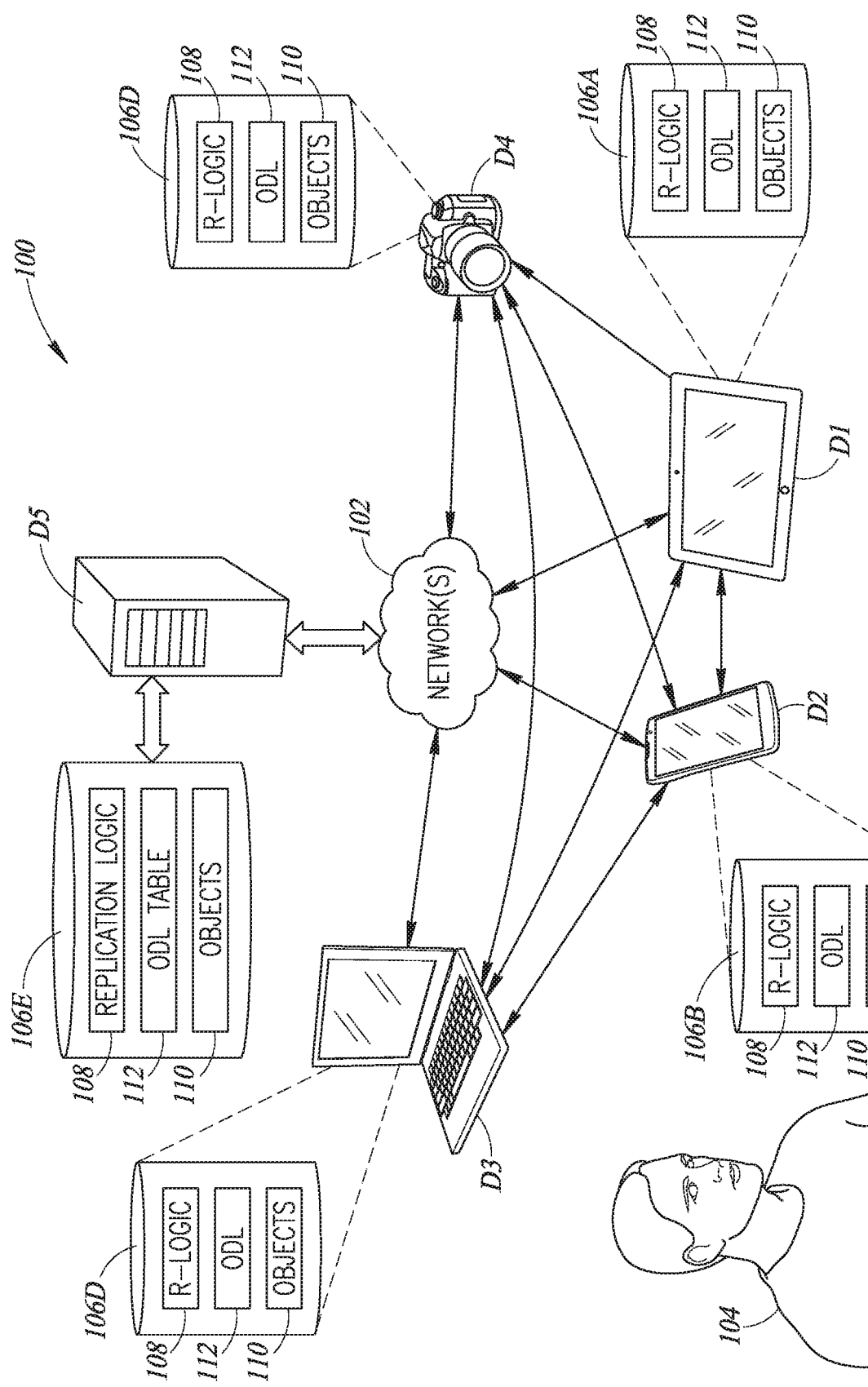
FIG. 1 is a networked environment in which a data storage system may be implemented, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure provide systems and methods that analyze a library of media objects (e.g., image files, video files, audio files, documents) to generate clusters of media objects that are associated with geolocation information (e.g., GPS data) and media objects without geolocation information so that the media objects in the media library without geolocation information can be given geolocation data in an automated user approved system. In at least some implementations, an approval system of visual overlays on a graphical user interface (GUI) lets users approve the proposed geolocation clusters and approve, modify or reject the geolocation proposals individually or as a group. The resulting approved clusters may then be tagged with geolocation information (e.g., GPS coordinates, city, state, etc.) and may then be automatically organized in a number of ways, including but not limited to, by location, on a map, on a calendar, etc.

The implementations of the present disclosure may be provided in an environment which automatically replicates content across a user's devices in a way that allows for full or partial replication, alternate forms, local network and remote location protection, with users being able to use their own storage and/or provided storage in the cloud. To provide context, such an environment is discussed below with reference to FIGS. 1 and 2. In some implementations, instances or copies of data objects (e.g., image files, video files, audio files, documents) may exist in a plurality of forms or representations. For example, in the case of image files, the image data object may exist in multiple forms wherein each form is an image file having a different resolution from the other forms of the data object. In some of the examples discussed below, image data objects may be in the form of original image files, lower resolution preview image files, and even lower resolution thumbnail image files.

In some implementations, the systems and methods provide partial or full object replication between multiple processor-based devices utilizes a form of a multi-master architecture in which any device can provide content to any other device to which the device is connected. No device is designated as a special master device/server from which all other devices must fetch content. Some implementations provide temporary protection of instances of original forms of objects, for example, when a user is traveling. Some implementations provide for relaying and shuttling of instances of objects across multiple devices via one or more networks and/or via peer-to-peer wired or wireless communications. Additionally, in some implementations discussed below, support for container and individual object replication policies with inheritance is provided. It should be appreciated that, as used herein, sending or receiving objects, or one or more forms of objects, may be equivalent to sending or receiving instances or copies of objects, or instances or copies of one or more forms of the objects. Such functionality is discussed in further detail below with reference to the figures.

FIG. 1 shows an example networked environment in which implementations of an object management system 100 of the present disclosure may be practiced. The networked environment includes a plurality of user processor-based devices D1-D4 and one or more service provider processor-based devices D5 (only one shown for clarity). The processor-based devices D1-D5 may be communicatively coupled with each other via one or more wired and/or wireless networks 102 (e.g., Wi-Fi, cellular, Internet). The service provider processor-based device D5 may include two or more devices (e.g., servers) interconnected via one or more networks which share resources, software, and/or data to any or all of the plurality of user processor-based devices and/or other devices. For example, the service provider processor-based device D5 may be one or more devices implemented utilizing a cloud-based architecture.

The user processor-based devices D1-D4 may represent various devices in the domain of a user 104. That is, the plurality of user processor-based devices D1-D4 may be accessed, used, controlled and/or owned by the user 104. Such user processor-based devices D1-D4 may be located in different locations, such as the user's home, school, office, vehicle, person, etc. Moreover, such user processor-based devices D1-D4 may be used for different applications, such as entertainment, education, occupation, communication, travel, etc. Similarly, the service provider processor-based device D5 may also have a portion of its storage and/or processing capacity allocated to the user 104.

In the illustrated implementation, the user processor-based devices D1-D4 are depicted as a tablet computer D1, a smartphone D2, a laptop computer D3, and a digital camera D4. The user processor-based devices Dl-D4 may include other types of devices, such as a desktop computer, gaming console, set-top box, video camera, audio recorder, media player, smart watch, smart TV, remote storage device accessible via a network (e.g., using a Web client or application), etc.

In addition to being communicatively coupled through the one or more networks 102, some or all of the user processor-based devices D1-D4 may communicate directly with each other without communicating through the network 102 and/or without communicating through an intermediate access point. For example, the user processor-based devices D1-D4 may communicate with each other through a local area network, wireless ad hoc network, Wi-Fi Direct®, USB, Bluetooth®, NFC, 802.15 (ZigBee®), etc. As discussed further below, such communications may enable various "offline" replication, synchronization, relay, shuttle, or other operations to be carried out without communicating through the one or more networks 102, which may advantageously provide communications when one or more user processor-based devices D1-D4 is not able to connect to the one or more networks or to another one of the devices. In particular, in some implementations changes can occur to objects and policies which are replicated without the devices being connected. Once the devices are connected, the policies are enforced and the content is synchronized.

The processor-based devices D1-D5 each include a respective nontransitory processor-readable medium 106A-106E. Some or all of the processor-based devices D1-D5 may include a replication application or logic 108 which utilizes the resources of the respective processor-based device to perform various replication, synchronization, relay, shuttle, or other operations. It is noted that in some implementations, the digital camera D4 may not include the replication logic 108. In these instances, the digital camera D4 may be used as an ingestion device which provides content to one or more computing devices, such as the devices D1, D2, D3 or D5, which in turn replicate the content to other devices.

The processor-based devices Dl-D5 collectively store the user's collection of objects 110, which may include various types of data objects such as image files, audio files, video files, documents, etc. As discussed further below, each of the objects may be represented in multiple forms, and one or more forms of each object may be simultaneously stored on one or more processor-based devices D1-D5. For example, an instance of an original form of an image may be stored on the nontransitory processor-readable medium 106D of the digital camera D4 and the nontransitory processor-readable medium 106C of laptop computer D3 of the user 104. As another example, an instance of an original form of an image may be stored on the nontransitory processor-readable medium 106C of the laptop computer D3, while an instance of a preview form of the image may be stored on the nontransitory processor-readable medium 106B of the smartphone D2 of the user 104, and an instance of a thumbnail form of the image may be stored on the nontransitory processor-readable medium 106A of the tablet computer D1 of the user.

As discussed in further detail below, each of the processor-based devices D1-D5 may store an object device link (ODL) table 112 which is replicated on a respective nontransitory processor-readable medium thereof which is used to perform object replication, synchronization, relay, shuttle, or other operations between the processor-based devices. The ODL table 112 stored on each of the processor-based devices D1-D5 allows each of the processor-based devices to be aware of whether each other processor-based device currently has a form of an object or needs a form of an object. The ODL table may be replicated to each of the devices using any suitable replication technology.

Figure 2:
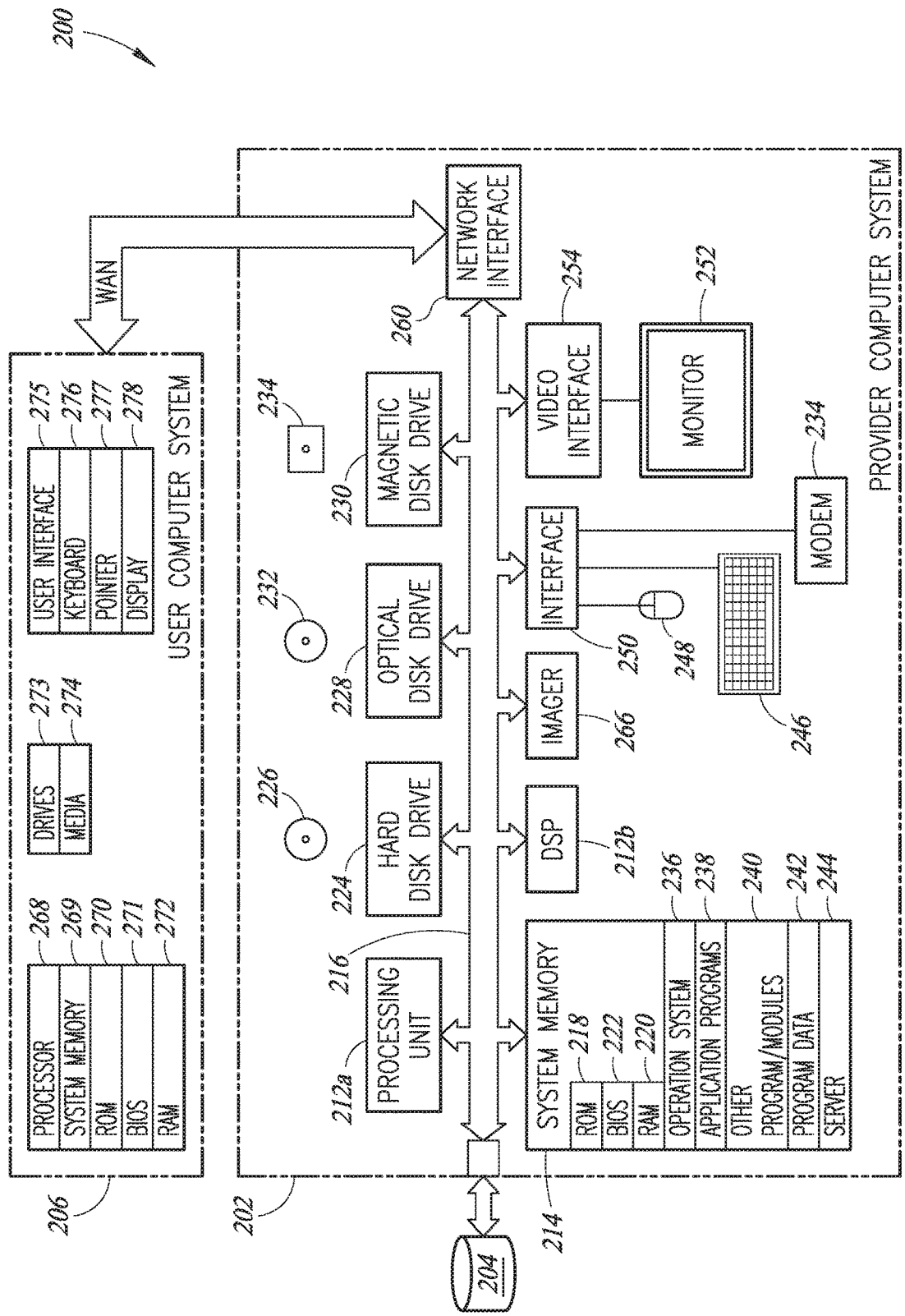
FIG. 2 is a functional block diagram of a data storage system and user processor-based device, according to one illustrated implementation.

FIG. 2 shows a networked environment 200 comprising one or more service provider server computer systems or devices 202 (only one illustrated) and one or more associated nontransitory computer- or processor-readable storage medium 204 (only one illustrated). The associated nontransitory computer- or processor-readable storage medium 204 is communicatively coupled to the service provider server computer system(s) 202 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 200 also includes one or more user processor-based systems or devices 206 (only one illustrated). For example, the user processor-based systems 206 may be representative of any one of the user processor-based devices of FIG. 1. The user processor-based systems 206 are communicatively coupled to the service provider server computer system(s) 202 by one or more communications channels, for example, one or more wide area networks (WANs) 210, for instance the Internet or Worldwide Web portion thereof.

In some implementations, the processor-based systems 206 may function as a client to the service provider server computing system 202. In some implementations, the service provider server computer system 202 may function as a server to receive requests or information from the processor-based systems 206. In some implementations, each of the user processor-based systems 206 may operate independently of the service provider server computing system 202 (e.g., as multi-masters). In some implementations, the service provider server computing system 202 may not be utilized at all, and the system may be implemented utilizing two or more processor-based devices associated with the user, which may include one or more cloud-based storage devices.

The networked environment 200 may employ other computer systems and network equipment, for example, additional servers, proxy servers, firewalls, routers and/or bridges. The service provider server computer systems 202 will at times be referred to in the singular herein, but this is not intended to limit the implementations to a single device since in typical implementations there may be more than one service provider server computer systems 202 involved. Unless described otherwise, the construction and operation of the various blocks shown in FIG. 2 are of conventional design. As a result, such blocks need not be described in further detail herein, as they will be understood by those skilled in the relevant art.

The service provider server computer systems 202 may include one or more processing units 212a, 212b (collectively 212), a system memory 214 and a system bus 216 that couples various system components, including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the service provider server computer system(s) 202, such as during start-up.

The service provider server computer systems 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the service provider server computer system 202. Although the depicted service provider server computer systems 202 is illustrated employing a hard disk drive 224, optical disk drive 228 and magnetic disk drive 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. The system memory 214 may also include communications programs, for example, a server 244 that causes the service provider server computer system 202 to serve electronic information or files via the Internet, intranets, extranets, telecommunications networks, or other networks as described below. The server 244 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the service provider server computer system(s) 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The service provider server computer system(s) 202 can include other output devices, such as speakers, printers, etc.

The service provider server computer systems 202 can operate in a networked environment 200 using logical connections to one or more remote computers and/or devices. For example, the service provider server computer systems 202 can operate in a networked environment 200 using logical connections to one or more processor-based systems 206. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the service provider server computer systems 202 and the processor-based systems 206.

The user processor-based systems 206 will typically take the form of end user processor-based devices, for instance, personal computers (e.g., desktop or laptop computers), netbook computers, tablet computers, smartphones, personal digital assistants, cameras, gaming consoles, wearable computers (e.g., smart watches) set-top boxes, workstation computers and/or mainframe computers, and the like, executing appropriate instructions. These processor-based systems 206 may be communicatively coupled to one or more server computers. For instance, processor-based systems 206 may be communicatively coupled externally via one or more end user client entity server computers (not shown), which may implement a firewall. The server computers 202 may execute a set of server instructions to function as a server for a number of processor-based systems 206 (e.g., clients) communicatively coupled via a LAN at a facility or site, and thus act as intermediaries between the processor-based systems 206 and the service provider server computer system(s) 202. The processor-based systems 206 may execute a set of client instructions to function as a client of the server computer(s), which are communicatively coupled via a WAN.

The processor-based systems 206 may include one or more processing units 268, system memories 269 and a system bus (not shown) that couples various system components including the system memory 269 to the processing unit 268. The processor-based systems 206 will at times each be referred to in the singular herein, but this is not intended to limit the implementations to a single processor-based systems 206. In typical implementations, there may be more than one processor-based system 206 and there will likely be a large number of processor-based systems 206.

The processing unit 268 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, a Snapdragon processor from Qualcomm, an Exynos processor from Samsung, or an Ax processor from Apple. Unless described otherwise, the construction and operation of the various blocks of the processor-based systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the end user client computer systems 206, such as during start-up.

The processor-based systems 206 may also include one or more media drives 273, e.g., a hard disk drive, magnetic disk drive, WORM drive, and/or optical disk drive, for reading from and writing to computer-readable storage media 274, e.g., hard disk, optical disks, and/or magnetic disks. The nontransitory computer-readable storage media 274 may, for example, take the form of removable media. For example, hard disks may take the form of a Winchester drive, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated nontransitory computer-readable storage media 274, provide nonvolatile storage of computer readable instructions, data structures, program modules and other data for the processor-based systems 206. Although described as employing computer-readable storage media 274 such as hard disks, optical disks and magnetic disks, those skilled in the relevant art will appreciate that processor-based systems 206 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated Web pages, other pages, screens or services hosted by the service provider server computer system 114.

In particular, the system memory 269 may include communications programs that permit the processor-based systems 206 to exchange electronic or digital information or files or data or metadata with the service provider server computer system 202. The communications programs may, for example, be a Web client or browser that permits the processor-based systems 206 to access and exchange information, files, data and/or metadata with sources such as Web sites of the Internet, corporate intranets, extranets, or other networks. Such may require that the processor-based systems 206 have sufficient right, permission, privilege or authority for accessing a given Website, for example, one hosted by the service provider server computer system(s) 202. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the processor-based systems 206 via a user interface 275 through input devices such as a touch screen or keyboard 276 and/or a pointing device 277 such as a mouse. Other input devices can include a microphone, joystick, game pad, tablet, imager, scanner, etc. These and other input devices are connected to the processing unit 268 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The processor-based systems 206 can include other output devices, such as speakers, printers, etc.

Referring now to FIGS. 3-13, implementations of the present disclosure provide systems and methods to autonomously add geolocation information to media objects. The functionality discussed below may be provided by one or more processors associated with one or more processor-based devices, such as the processor-based devices discussed above with reference to FIGS. 1 and 2.

Figure 3:
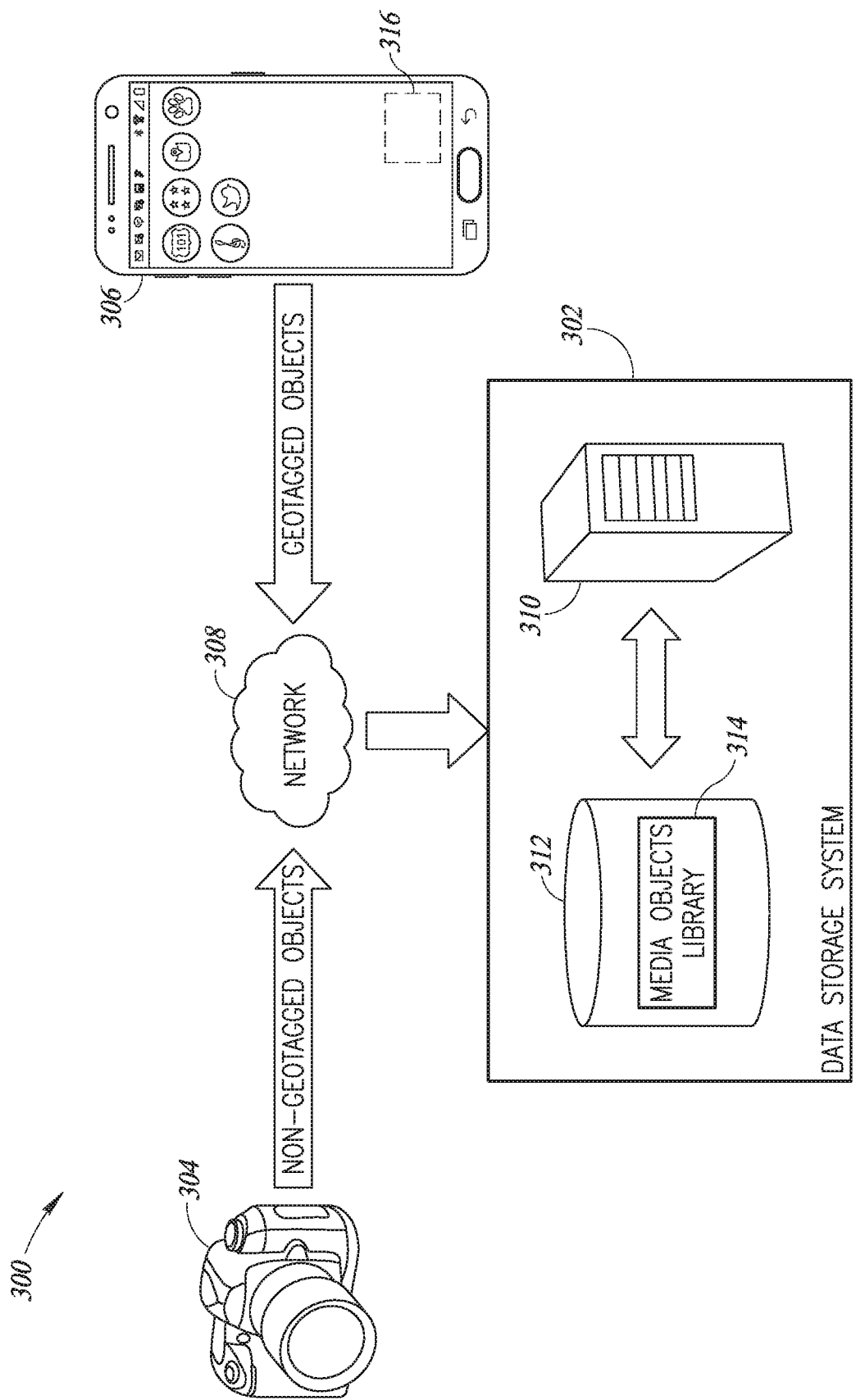
FIG. 3 is a schematic diagram of a data storage system that stores a library of media objects received from multiple processor-based devices, according to one illustrated implementation.

FIG. 3 shows an example networked environment in which implementations of an object management system 300 of the present disclosure may be practiced. The networked environment includes a data storage system 302 and user processor-based devices 304 and 306. The data storage system 302 and the processor-based devices 304 and 306 may be similar or identical to one or more of the devices D1-D5 of FIG. 1 or the devices 202 and 206 of FIG. 2, for example. The devices 302, 304 and 306 may be communicatively coupled with each other via one or more wired and/or wireless networks 308 (e.g., Wi-Fi, cellular, Internet), which may be similar or identical to the networks 102 of FIG. 1. The data storage system 302 may include at least one processor 310 and at least one nontransitory processor-readable storage medium 312 communicatively coupled to the at least one processor 310 which stores a library 314 of media objects. The data storage system 302 and components thereof may include two or more devices interconnected via one or more networks which share resources, software, and/or data to any or all of the plurality of user processor-based devices and/or other devices.

In the illustrated implementation, the user processor-based devices 304 and 306 are depicted as a digital camera and a smartphone, respectively. The user processor-based devices 304 and 306 may include other types of devices, such as a tablet computer, laptop computer, desktop computer, gaming console, set-top box, video camera, audio recorder, media player, smart watch, smart TV, remote storage device accessible via a network (e.g., using a Web client or application), etc.

The digital camera 304 and the smartphone 306 may each include functionality to capture photos and to store image files in a suitable format (e.g., JPEG, TIFF, raw image format). In this non-limiting example, the smartphone 306 is operative to automatically geotag photos, and the digital camera 304 provides image files which are not geotagged, referred to herein as "non-geotagged" image files. Although the smartphone 306 and digital camera 304 are provided as examples, it should be appreciated that any of a number of types of devices may be used to capture and/or store geotagged and/or non-geotagged media objects. For example, a user may utilize a first digital camera that automatically geotags image files and a second digital camera that does not automatically geotag image files. As another example, a user may store a first set of image files on a first device in a folder titled "Hawaii 2010," such that the system may recognize the image files in the folder as being geotagged with Hawaii as the location. The user may store a second set of image files on the first device or on another device that are not directly or indirectly associated with geolocation information, so such image files may be deemed to be non-geotagged image files. Generally, geotagging is the process of adding geographical identification metadata to media such as image files, video files, documents, websites, SMS messages, RSS feeds, etc. This data may include latitude and longitude coordinates, and may additionally or alternatively include altitude data, bearing data, distance data, accuracy data, place names, and/or regions. In some instances, the geolocation data may include less precise information, such as one or more of a neighborhood, a city, a county, a state, a multi-state region, a country or a continent in which the image was captured.

In at least some implementations, a media object may be considered to be "geotagged" based on hints or information (e.g., indirect information) that signifies location information for the media object. Thus, devices that capture or store media objects may automatically or manually "geotag" objects by associating such with geolocation information. Such information may include keywords, folder names, file names, place names (e.g., Niagara Falls, Grand Canyon), image content, textual content, GPS data, or other data that are directly or indirectly indicative of location information. For example, the system may infer that a photo in a folder titled "Chicago 2016" was likely captured in Chicago, Ill. As another example, the system may infer that a photo tagged with the keyword "Seahawks Game" was likely captured in Seattle, Wash., since the Seahawks are a football team based in Seattle. As another example, the system may utilize image recognition techniques to detect location information, such as identifying landmarks, intersections, place names, street names, etc., present in photos or videos. To automatically geotag image files, the smartphone 306 may include a built-in or connected geolocation subsystem 316, such as a global positioning system (GPS) receiver. In operation, when the smartphone 306 captures an image, the smartphone may concurrently capture geolocation information, such as GPS data, from the geolocation subsystem 316. The geolocation information may be logically associated with the captured image file in a nontransitory processor-readable storage medium of the smartphone 306. As an example, for photos stored in many formats (e.g., JPEG, TIFF), the geolocation information may be embedded in metadata, stored in Exchangeable image file format (Exif) or Extensible Metadata Platform (XMP) format. These data are not visible in the image itself but are read and written by programs which utilize the data for a variety of purposes, as discussed further below.

The data storage system 302 may receive geotagged image files from the smartphone 306 and non-geotagged image files from the digital camera 304 and may store the image files in the media library 314 in the nontransitory processor-readable storage medium 312. Each of the non-geotagged and geotagged images may include capture time metadata that indicates when each of the image files was captured by one of the digital camera 304 or the smartphone 306. In practice, the data storage system 302 may receive image files from a numerous devices that capture image files. Further, the data storage system 302 may be representative of a storage system that physically located at one or more of the processor-based devices (e.g., digital camera 304, smartphone 306) of the object management system 300.

As an example, a user may capture images while on vacation using the digital camera 304 and the smartphone 306. Subsequent to capturing at least some images, (e.g., when the user returns from vacation), the user may have 100 geotagged images from the smartphone 306 and 1000 non-geotagged images from the digital camera 304 stored in the media library 314. Utilizing features of the present disclosure, geolocation information (e.g., GPS tags) may be autonomously added to the non-geotagged images so that all of the user's images in the media library 314 are geotagged. To add geolocation information to non-geotagged images, the systems and methods disclosed herein may utilize image object recognition, image optical character recognition (OCR), metadata analysis (e.g., keywords, file names, folder names, GPS data), or other methods. Generally, at least some of the implementations of the present disclosure provide an automated method for non-geotagged images to be identified as being from the same photo shoot as one or more geotagged photos so that the non-geotagged photos may be assigned geolocation information.

In at least some implementations, the at least one processor 310 of the data storage system 302 may analyze the media library 314 looking for clusters of geotagged images and non-geotagged images so that the non-geotagged images may be provided geolocation information in an automated and optionally user approved system. Once the image files are imported into the media library 314, the at least one processor 310 utilizes algorithms to autonomously cluster relevant geotagged images and non-geotagged images. The at least one processor 310 may look for one or more clustering conditions or "hints" to generate one or more clusters of image files. The one or more clustering conditions may include capture time, capture time and geolocation information for the geotagged images, and/or other clustering conditions. If a particular cluster has both a geotagged image and a non-geotagged image, the at least one processor 310 may propose to the user that the images are from the same location using heuristics to present the user with the most likely locations of the non-geotagged images.

In at least some implementations, the determined clusters may be presented to the user in a descending level of precision. For example, the clusters may be presented to the user according to the following order: country, state, city, address, GPS data. A user may confirm that an image belongs to the proposed clusters at any level of precision. If a user confirms the cluster for an image at a precision level above GPS data (e.g., city level, state level), the at least one processor 310 stores this general ("fuzzy") level of precision in the metadata for the image.

In at least some implementations, the at least one processor 310 allows the user to batch or individually confirm the location of the non-geotagged images. When a user confirms the correct location, the images are tagged with the appropriate geolocation information (e.g., GPS data, lower precision data) and are autonomously presented by the data storage system 302 in any suitable manner, such as in smart albums, maps, calendars, etc.

Figure 4:
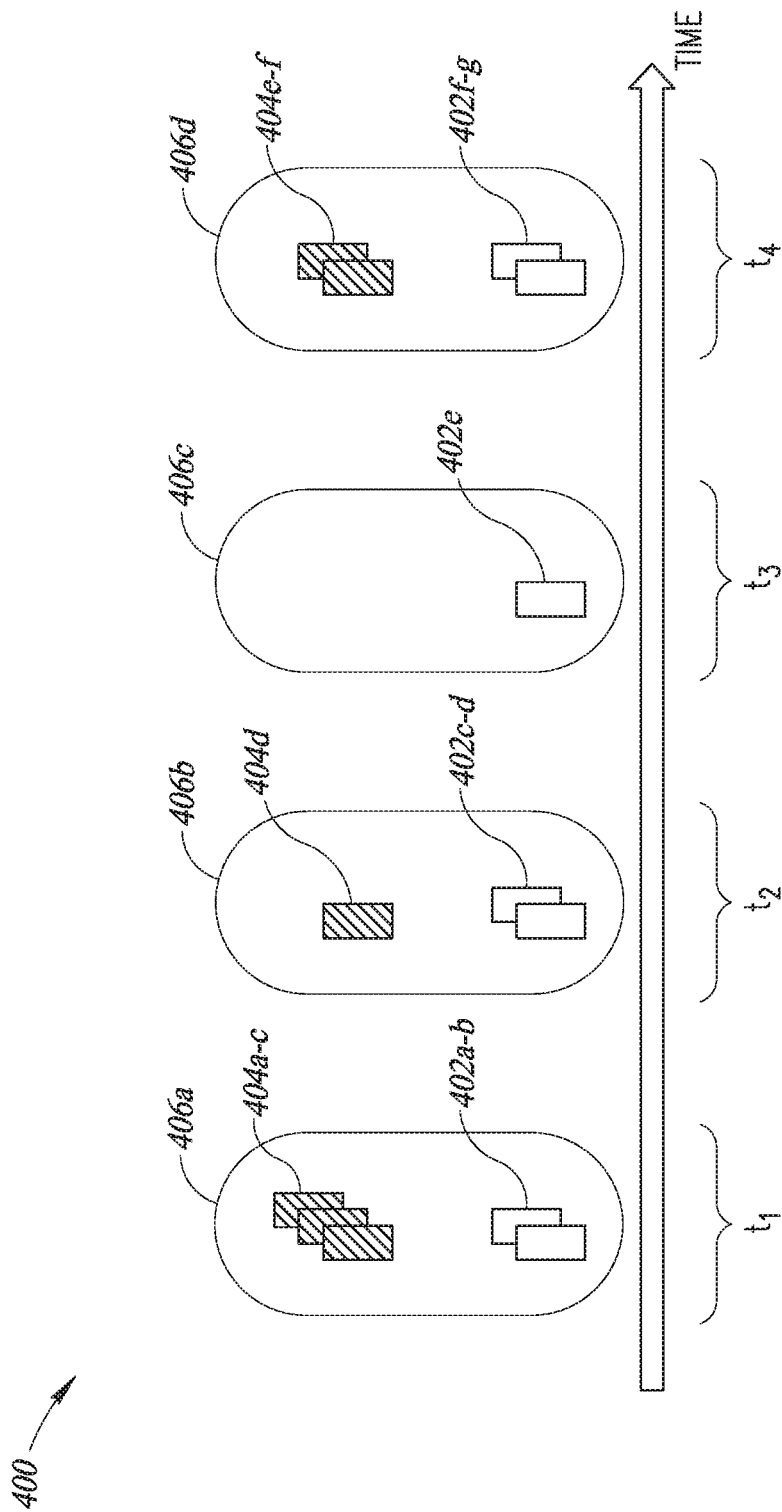
FIG. 4 is a graph that illustrates a method of operating a data storage system to cluster media objects based on capture time, according to one illustrated implementation.

FIG. 4 shows a timeline 400 which illustrates an example of how the at least one processor 310 of the data storage system 302 may group or cluster images (or other types of media objects) in the media library 314. In this example, a number of geotagged images 402 are captured (e.g., by smartphone 306) at time ranges $t_1$, $t_2$, $t_3$ and $t_4$. In particular, geotagged images 402a-b are captured during time range $t_1$, geotagged images 402c-d are captured during time range $t_2$, geotagged image 402e is captured during time range $t_3$, and geotagged images 402f-g are captured during time range $t_4$. The geotagged images may be images that are captured with GPS data. As another example, the geotagged images 402 may be images that are provided to the system with hints that the system may utilize to determine or guess the capture locations of the images. For example, the system may utilize one or more keywords, folder names, file names, image content, or other information to determine the capture locations of the geotagged images 402. As a particular example, a user may import a folder of images stored in a folder named "Hawaii 1995." The system may utilize such information to identify that the images in the folder were likely captured in Hawaii. The system may also utilize the information to determine time or date information. In the above example, the system may determine that the images in the "Hawaii 1995" folder were likely captured in 1995, and may prompt the user to confirm such.

A number of non-geotagged images 404 are also captured (e.g., by digital camera 304). In particular, non-geotagged images 404a-c are captured during time range $t_1$, non-geotagged image 404d is captured during time range $t_2$, and non-geotagged images 404e-f are captured during time period $t_3$. The time ranges $t_{1-4}$ may be fixed or variable time ranges, and may have any suitable duration (e.g., minutes, hours, days, weeks).

In this simplified example, the at least one processor 310 of the data storage system 302 generates four clusters 406a-d that each correspond to one of the time ranges $t_{1-4}$. That is, the clustering condition utilized by the at least one processor 310 in this example is capture time for the images, automatically provided in the metadata associated with the images. The cluster 406a includes geotagged images 402a-b and non-geotagged images 404a-c. The cluster 406b includes geotagged images 402c-d and non-geotagged image 404d. The cluster 406c includes geotagged image 402e and no non-geotagged images. The cluster 406d includes geotagged images 402f-g and non-geotagged images 404e-f.

In at least some implementations, the at least one processor 310 may propose to a user the non-geotagged images 404a-c as belonging to the cluster 406a along with the geotagged images 402a-b via a graphical user interface. The user may approve or confirm that the non-geotagged images 404a-c belong to the cluster 406a. The user may alternatively modify the cluster 406 in which any one of the non-geotagged images 404 are placed.

The at least one processor 310 may logically associate geolocation information with the non-geotagged images 404a-c based at least in part on the geolocation information of the geotagged images 402a-b. For example, the at least one processor 310 may supply geolocation information for the approved images at the appropriate level of precision autonomously determined by the system and/or approved by the user. As noted above, in at least some implementations the at least one processor 310 may allow for approval in descending levels of precision (e.g., country, state, county, city, address, GPS data). This process may be similarly repeated for the clusters 406b, 406c and 406d. Once geo-tagged, the images 402 and 404 may be display and/or autonomously organized in a number of ways including, but not limited to, by smart albums, locations, calendars, and/or maps.

Figure 5:
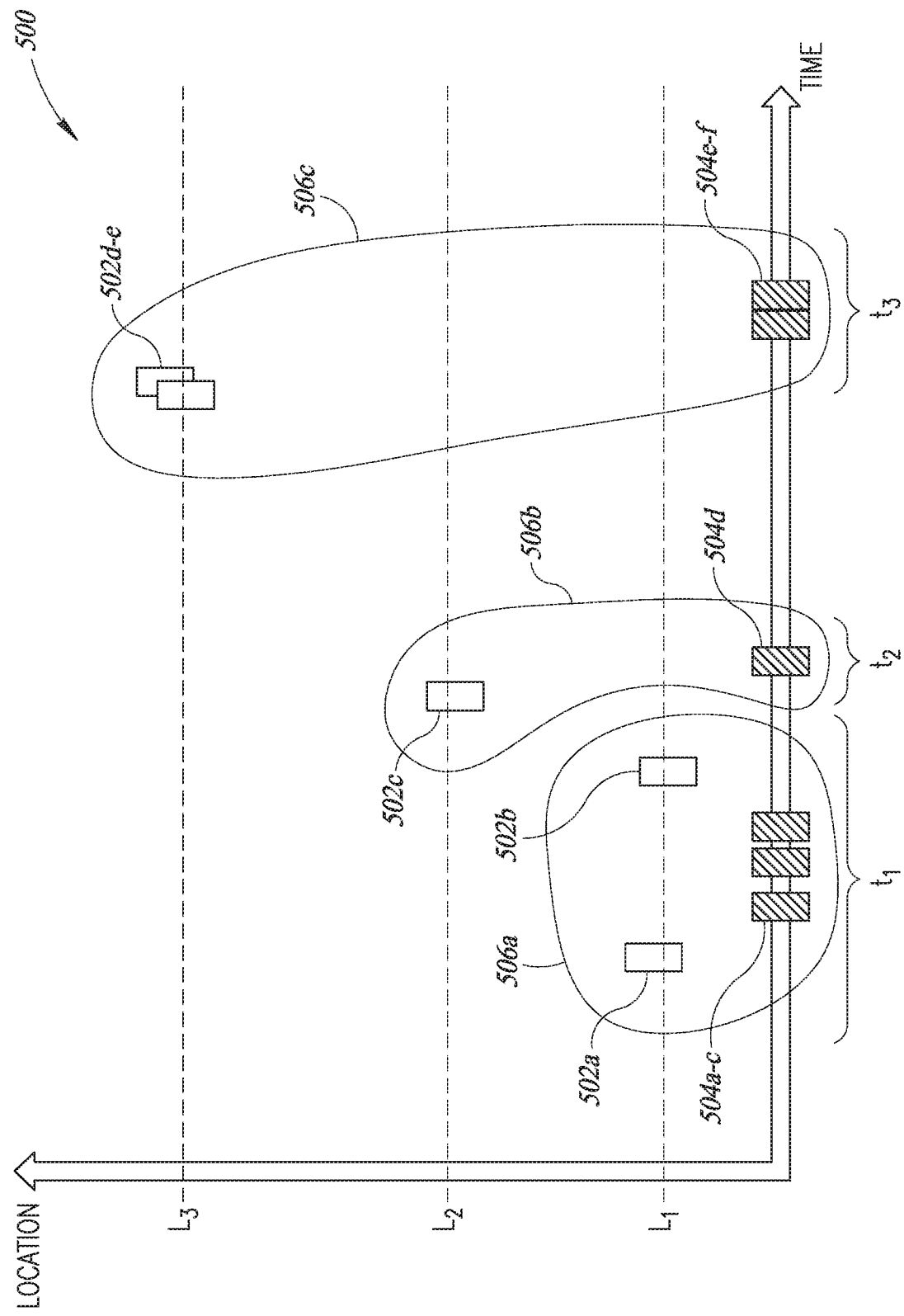
FIG. 5 is a graph that illustrates a method of operating a data storage system to cluster media objects based on capture time and geolocation information, according to one illustrated implementation.

FIG. 5 shows a graph 500 which illustrates an example of how the at least one processor 310 of the data storage system 302 may cluster images (or other types of media objects) in the media library 314 utilizing clustering criteria that includes at least capture time and geolocation information for the geotagged images. The horizontal axis of the graph 500 represents capture time, and the vertical axis in this example represents relative capture location. In this example, a number of geotagged images 502 are captured (e.g., by smartphone 306) at time ranges $t_1$, $t_2$, and $t_3$ at various relative locations $L_1$, $L_2$, and $L_3$. As discussed above, the geotagged images 502 may be tagged with GPS data or may be associated with other hints (e.g., keyword, folder name) that are indicative of capture location. In particular, geotagged images 502a-b are captured during time range $t_1$ at location $L_1$, geotagged image 502c is captured during time range $t_2$ at location $L_2$, and geotagged images 502d-e are captured during time range $t_3$ at location $L_3$. A number of non-geotagged images 504 are also captured (e.g., by digital camera 304) at various times. The non-geotagged images 504 are shown positioned on the horizontal axis of the graph 500 since such images are not associated with geolocation information. The non-geotagged images 504a-c are captured during time range $t_1$, the non-geotagged image 504d is captured during time range $t_2$, and the non-geotagged images 504e-f are captured during time period $t_3$.

In this simplified example, the at least one processor 310 of the data storage system 302 generates three clusters 506a-c that each correspond to one of the time ranges $t_{1-3}$. That is, the clustering condition utilized by the at least one processor 310 is capture time for the images as well as geolocation information for the geotagged images 502. The cluster 506a includes geotagged images 502a-b and non-geotagged images 504a-c. The cluster 506b includes geotagged image 502c and non-geotagged image 504d. The cluster 506c includes geotagged images 502d-e and non-geotagged images 504e-f.

In this example, the at least one processor 310 may detect that the user moved from location $L_1$ to location $L_2$ between capturing geotagged images 502b and 502c. The at least one processor 310 may utilize such information as a clustering condition or hint to indicate that geotagged images 502b and 502c should be grouped into separate clusters since they are from different photo shoots. Thus, although the non-geotagged image 504d may have been captured relatively close in time to geotagged image 502b, the at least one processor 310 does not cluster the non-geotagged image 504d with the geotagged image 502b because the system determined using the geolocation information for the geotagged image 502c that the user moved locations after capturing the geotagged image 502b and prior to capturing the non-geotagged image 504d.

In at least some implementations, the at least one processor 310 may propose to a user the non-geotagged images 504a-c as belonging to the cluster 506a along with the geotagged images 502a-b via a graphical user interface. The user may approve or confirm that the non-geotagged images 504a-c belong to the cluster 506a. The user may alternatively modify the cluster 506 in which any one of the non-geotagged images 504 are placed.

The at least one processor 310 may logically associate geolocation information with the non-geotagged images 504a-c based at least in part on the geolocation information of the geotagged images 502a-b. For example, the at least one processor 310 may supply geolocation information for the non-geotagged images at the appropriate level of precision determined by the system and/or approved by the user. As noted above, in at least some implementations the at least one processor 310 may allow for approval in descending levels of precision (e.g., country, state, county, city, address, GPS data). This process may be similarly repeated for the clusters 506b and 506c. Once geo-tagged, the images 502 and 504 may be displayed and/or autonomously organized in a number of ways including, but not limited to, by smart album, location, calendar, and/or on a map.

In at least some implementations, the at least one processor 310 may supply geolocation information for non-geotagged images using the geolocation information for a plurality of geo-tagged images. For example, the at least one processor 310 may detect that the user is traveling, and may estimate the geolocation of a non-geotagged image based on the geolocation of one or more geotagged images captured before the non-geotagged image and/or one or more geotagged images captured after the non-geotagged image. As a non-limiting example, the at least one processor 310 may determine that the user is hiking at a rate estimated utilizing the timestamps and geotags of a plurality of geotagged images. Using this information, the at least one processor 310 may accurately estimate the location of the user when a non-geotagged image is captured (e.g., by a digital camera). The estimated location information may be logically associated with the image and may optionally be presented to the user for approval or modification.

In at least some implementations, the system may identify a first cluster of non-geotagged media objects that is preceded in time by a second cluster that contains at least one geotagged media object and followed by a third cluster that contains at least one geotagged media object. The system may utilize the known location information for the second and third clusters to prompt the user to specify location information for the first cluster of non-geotagged media objects.

As a non-limiting example, on a first day a user may capture a first cluster of geotagged images in Honolulu, Hi. On a second day, the user may capture a second cluster of non-geotagged images. On a third day, the user may capture a third cluster of geotagged images in Maui, Hi. Upon detecting the clusters of geotagged images captured on the first and third days, the system may prompt the user to specify location information for the second cluster captured on the second day. In at least some implementations, the system may suggest one or more locations for the user to select based on the locations of images captured proximate to the non-geotagged images. Continuing with the example above, the system may provide Honolulu, Maui, and/or the state of Hawaii to the user as possible locations for the second cluster of non-geotagged images captured on the second day.

In at least some implementations, the system may provide the user with a list of possible locations for a cluster of non-geotagged media objects. For example, the system may provide the user with a list that is ranked based at least in part on an estimated likelihood that the images in the cluster were captured at the location. In the above example, the system may estimate that the cluster was most likely captured in Honolulu, so Honolulu may be presented first in a list of possible locations, followed by other locations in a descending order based on each of the locations' determined likelihood of being the correct location.

Figure 6:
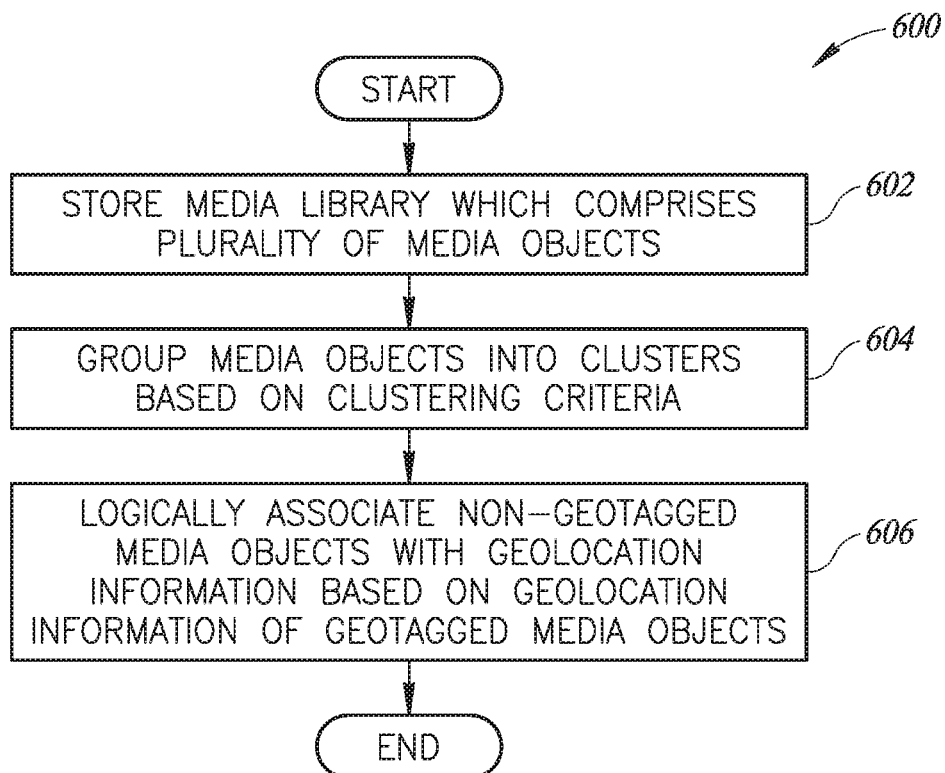
FIG. 6 is a flow diagram of a method of operating a data storage system to add geolocation information to non-geotagged media objects, according to one illustrated implementation.

FIG. 6 shows a method 600 of operation for a data storage system to add geolocation information to at least some of a plurality of objects stored in a media objects library. The method 600 may be performed by one or more of the processor-based devices shown in FIGS. 1-3 associated with the data storage system, for example.

At 602, at least one processor of the data storage system stores a media library that includes a plurality of media objects in at least one nontransitory processor-readable storage medium. The media objects may be captured from a plurality of sources (e.g., digital camera, smartphone, scanner, tablet computer), at least one of which provides geotagged media objects. The plurality of media objects may include at least one geotagged media object and at least one non-geotagged media object. As discussed above, each geotagged media object is logically associated (e.g., via metadata, file name, folder name) with geolocation information, and each non-geotagged media object is not logically associated with geolocation information. The plurality of media objects may include image media objects, video media objects, document media objects, or other types of media objects.

At 604, the at least one processor of the data storage system may group at least some of the plurality of media objects in the media library into one or more clusters based at least in part on at least one clustering condition. In at least some implementations, the at least one clustering condition may include capture time of the media objects. As another example, the at least one clustering condition may include both a capture time of the media objects and geolocation information of at least one of the geotagged media objects. The at least one processor may additionally or alternatively utilize various other clustering conditions or criteria which may provide clues regarding the capture location of non-geotagged media objects.

At 606, for each of the one or more clusters that includes at least one non-geotagged media object, the at least one processor of the data storage system may logically associate each of the non-geotagged media objects in the cluster with geolocation information in the at least one nontransitory processor-readable storage medium based at least in part on geolocation information that is logically associated with at least one geotagged media object in the cluster. For example, the at least one processor may logically associate each of the non-geotagged media objects in a cluster with geolocation information that is identical to or of a different precision (e.g., less precise, more precise) than the geolocation information of at least one of the geotagged media objects.

In at least some implementations, the at least one processor may logically associate each of the non-geotagged media objects with geolocation information that is indicative of a geographic region comprising at least one of GPS coordinates, a neighborhood, a city, a county, a state, a multi-state region, a country or a continent. The at least one processor may logically associate each of the non-geotagged media objects with hierarchical geolocation information (e.g., city, state, country) based at least in part on geolocation information (e.g., GPS data) that is logically associated with at least one geotagged media object in the cluster.

Figure 7:
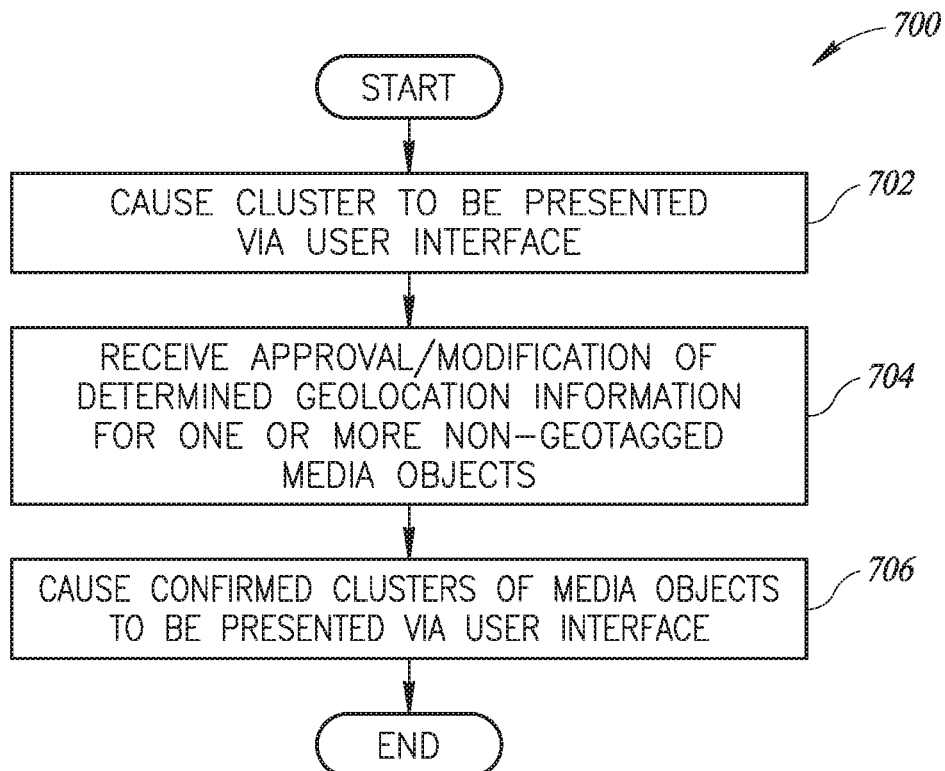
FIG. 7 is a flow diagram of a method of operating a data storage system to present geolocation information for non-geotagged media objects to a user for approval, according to one illustrated implementation.

FIG. 7 shows a method 700 of operation for a data storage system to present a plurality of objects stored in a media objects library for approval and/or modification of autonomously determined geolocation information. The method 700 may be performed by one or more of the processor-based devices shown in FIGS. 1-3 associated with the data storage system, for example. In at least some implementations, the method 700 may be performed in conjunction with the method 600 of FIG. 6.

At 702, the at least one processor of the data storage system may cause at least one of the non-geotagged media objects and the geolocation information logically associated therewith to be presented via a user interface, such as a display of a smartphone, tablet computer, laptop computer, desktop computer, etc. As discussed below with reference to FIGS. 8-13, in at least some implementations the non-geotagged media objects are presented in a set of geographically hierarchical containers.

At 704, the at least one processor may receive, via the user interface, an approval of the logical association between the non-geotagged media object and the geolocation information, or may receive a request for modification of the logical association between the non-geotagged media object and the geolocation information. Responsive to receiving a request for modification of the logical association, the at least one processor may modify the logical association between the non-geotagged media object and the geolocation information in the at least one nontransitory processor-readable storage medium.

In at least some implementations, the at least one processor may simultaneously receive at least one of an approval of the logical association between a plurality of the non-geotagged media objects and geolocation information or a request for modification of the logical association between a plurality of the non-geotagged media objects and geolocation information. For example, the user may simultaneously approve or modify the geolocation information for some or all of the non-geotagged media objects in a particular cluster.

In at least some implementations, the at least one processor may cause at least one of the one or more clusters to be presented via a user interface in descending levels of precision. For example, the at least one processor may cause at least one of the one or more clusters to be presented in descending levels of precision comprising least two of: country, state, city, address, and GPS coordinates.

At 706, the at least one processor causes at least one of the one or more confirmed clusters to be graphically presented via a user interface. For example, the at least one processor may cause one or more clusters to be presented as smart albums, on a map, on a calendar, or in any other manner.

FIGS. 8-13 show various example screenshots of a graphical user interface of the data storage system showing the mechanics of approving clusters of media objects autonomously determined by the at least one processor of the data storage system. In this illustrated example, the at least one processor presents clusters to users for approval at hierarchical levels of precision including country, state, city, address, and GPS coordinates. It will be appreciated that in other implementations different levels of precision may be utilized.

Figure 8:
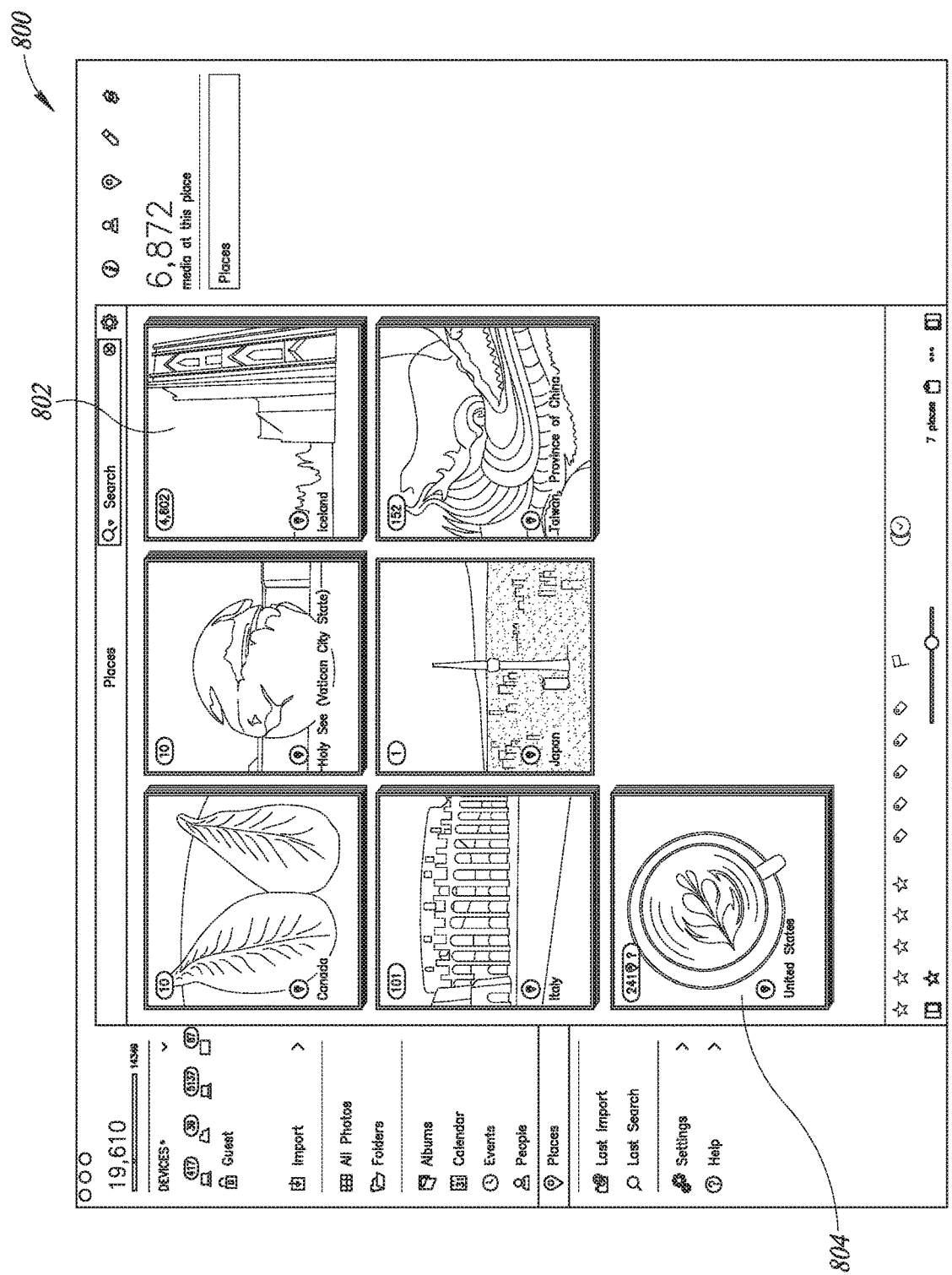
FIG. 8 is a screenshot of a graphical user interface of a data storage system showing a plurality of country level containers of media objects, according to one illustrated implementation.

FIG. 8 shows a screenshot 800 of the graphical user interface that presents images in a plurality of country level containers. In this example, the user's media library includes images from seven countries, namely Canada, Vatican City, Iceland, Italy, Japan, Taiwan and the United States. The container for the United States, indicated by reference numeral 804, is shown enlarged in the screenshot 900 of FIG. 9.

Figure 9:
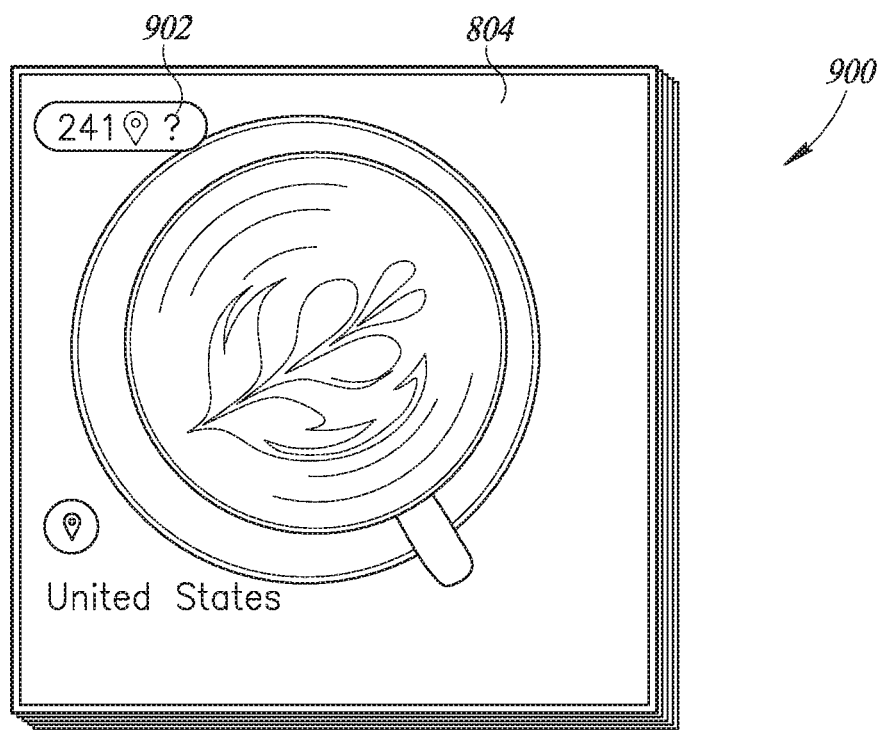
FIG. 9 is a screenshot of a graphical user interface of a data storage system showing one of the country level containers of the screenshot of FIG. 8, according to one illustrated implementation.

At each level (e.g., country, state, city, address, GPS coordinates), one or more containers may include a cluster of proposed non-geotagged images for geotagging. For example, the screenshot 900 of FIG. 9 shows that the United States container 804 includes an indicator 902 (e.g., "?") that indicates to the user that the container includes images with proposed geolocation tags that await user approval or modification. The user may open the container 804 by selecting the container to view the proposed images so that the user may approve or modify the proposed geolocation information for the proposed images in the container.

Figure 11:
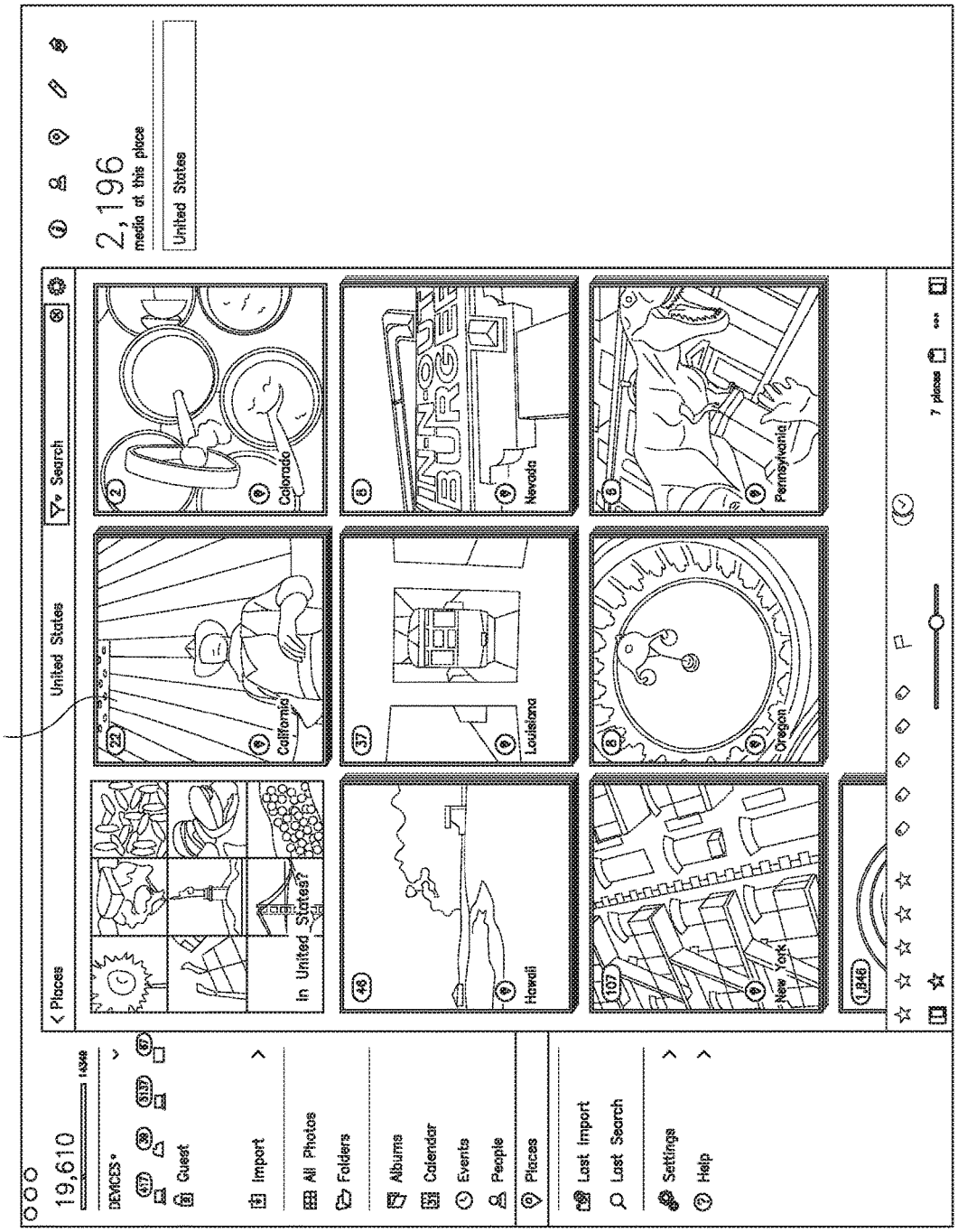
FIG. 11 is a screenshot of a graphical user interface of a data storage system showing a plurality of state level containers of media objects, according to one illustrated implementation.

As shown in a screenshot 1100 of FIG. 11, upon selection of the United States container 804, the at least one processor presents state level containers 1102 that include geolocation cluster proposals at the state level. The user may open any of the state level containers 1102 to view the individual images and an approval user interface.

Figure 10:
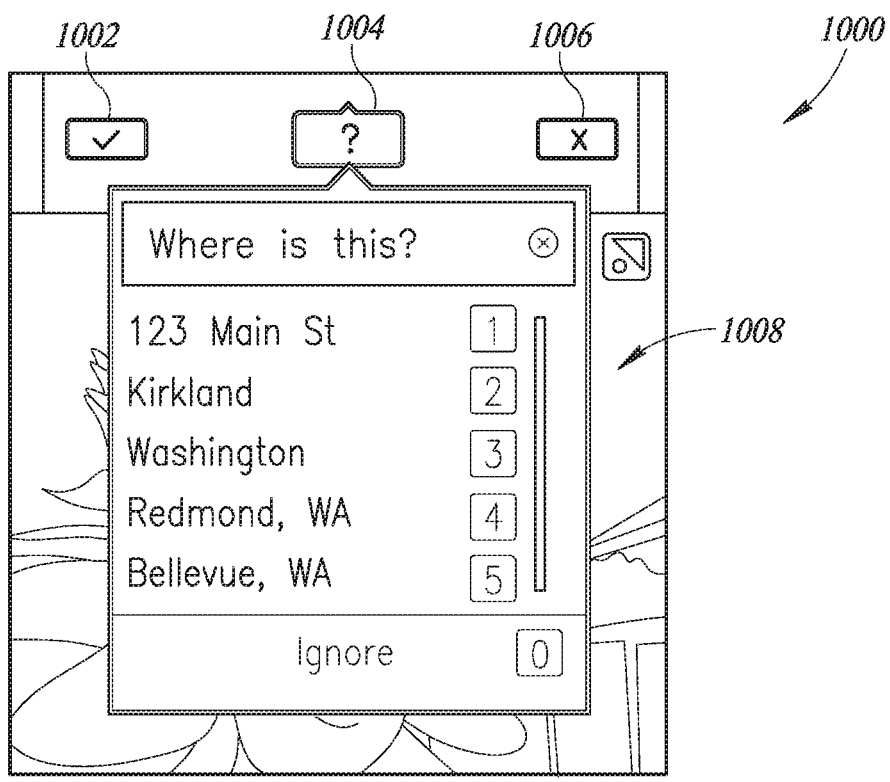
FIG. 10 is a screenshot of a graphical user interface of a data storage system showing an approval user interface, according to one illustrated implementation.

An example approval user interface is shown in a screenshot 1000 of FIG. 10. The approval user interface includes an approval or confirmation icon 1002, a location selection icon 1004, and a dismiss geolocation information icon 1006. User selection of the confirmation icon 1002 causes the at least one processor to confirm or approve the geolocation information autonomously determined by the data storage system. User selection of the dismiss geolocation information icon 1006 causes the at least one processor to dismiss the geolocation information from the image. User selection of the location selection icon 1004 causes the at least one processor to present a drop-down menu 1008 which provides a list of locations that may be manually selected by the user. In the illustrated example, the list of locations includes an address and a plurality of cities, but in other implementations other types of locations at various levels of precision may be presented, such as state, city, address, GPS coordinates. The list may include locations determined by the system to be candidate locations for the image. In some implementations, the list of locations may be presented in a ranked order of locations according to a determined likelihood that the image was captured at each location in the list.

Figure 12:
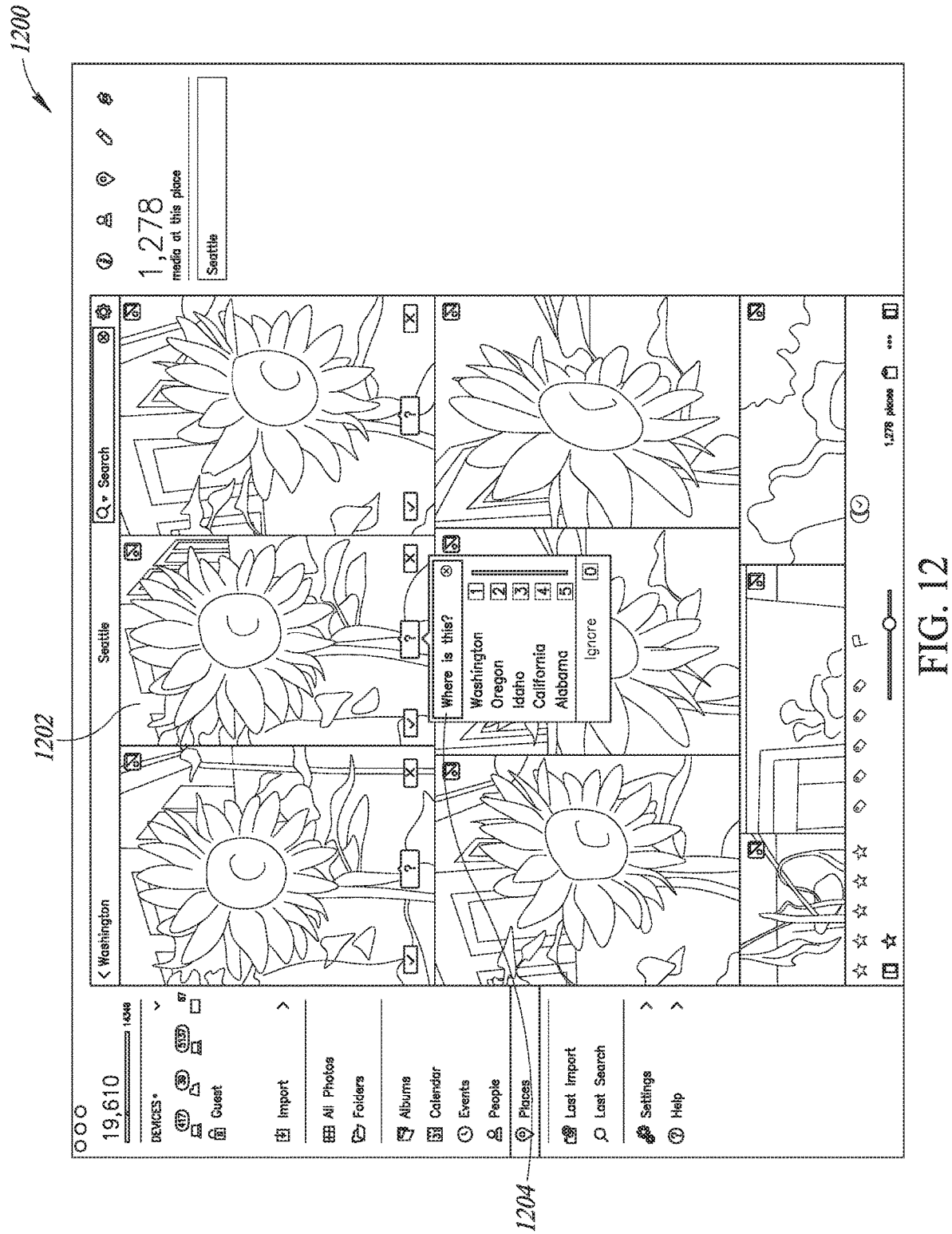
FIG. 12 is a screenshot of a graphical user interface of a data storage system showing a plurality of media object in a state level container and an approval user interface, according to one illustrated implementation.

As shown in the screenshot 1200 FIG. 12, upon selection of one of the state level containers 1102, the at least one processor may cause the non-geotagged images 1202 that are waiting for approval to be presented to the user via the user interface. The user may utilize an approval user interface 1204 to approve or modify the location information for each image. The user may approve the images one at a time, or may select a plurality or all of the images in a container and approve or modify them as a group. Using the approval user interface 1204, if an image in the proposed cluster is not in the correct state, the user can choose to dismiss the proposal (e.g., via the dismiss icon 1006) or may select from a list of most likely states autonomously determined by the data storage system. The approval user interface may also provide the user with a list of all states for that country so the user has the option of selecting a state that is not proposed by the system.

Figure 13:
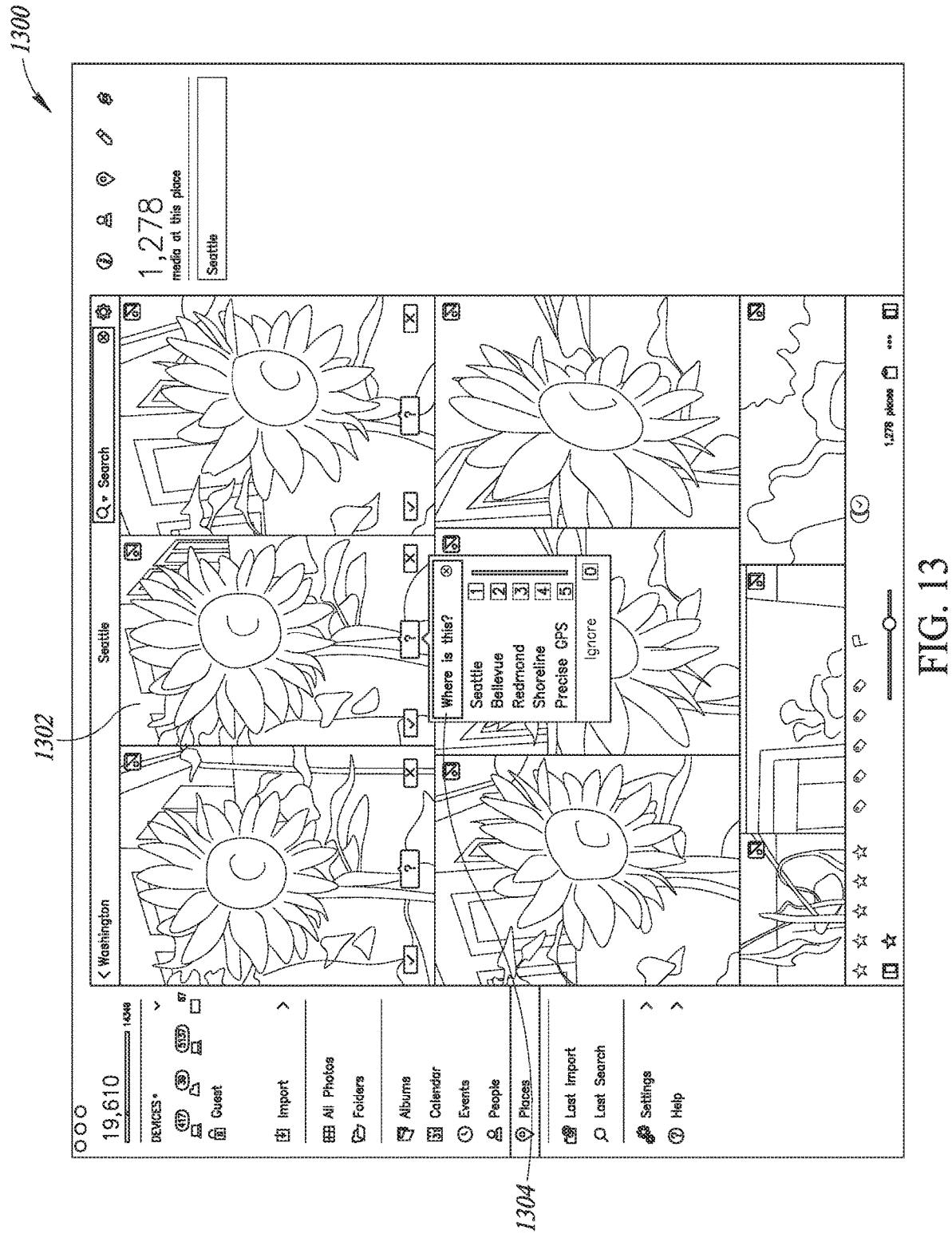
FIG. 13 is a screenshot of a graphical user interface of a data storage system showing a plurality of media object in a city level container and an approval user interface, according to one illustrated implementation.

FIG. 13 shows a screenshot 1300 of a plurality of non-geotagged images that await approval or modification for a city level container. The user may utilize an approval user interface 1304 to approve or modify the location information for each image. The user may approve the images one at a time, or may select a plurality or all of the images in a container and approve or modify them as a group. Using the approval user interface 1304, if an image in the proposed cluster is not in the correct city the user can choose to dismiss the proposal (e.g., via the dismiss icon 1006) or select from a list of most likely cities autonomously determined by the data storage system. The approval user interface may also provide the user with a list of some or all cities for that state so the user has the option of selecting a city that is not proposed by the system. If a proposed non-geotagged image was captured in precisely the same location as a GPS tagged image, the user may select "Precise GPS" via the approval user interface 1304 to assign the GPS coordinates of a geotagged image to the non-geotagged image.

The assignment of geolocation information for media object may be implemented at a number of levels of precision. For example, an image may be given a general country level geolocation tag (e.g., GPS tag) but not a state level geolocation tag or city level geolocation tag. Similarly, an image may be given a state level geolocation tag but not a city level geolocation tag. Such feature provides the user with a flexible level of precision when tagging non-geotagged images or other media objects.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, solid state drives, flash memory storage, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Pat. No. 9,300,737 issued on Mar. 29, 2016, U.S. Provisional Application No. 62/339,621, filed on May 20, 2016, and U.S. Provisional Application No. 62/487,664 filed on Apr. 20, 2017, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation for a data storage system to add geolocation information to a plurality of media objects, the method comprising:

storing, in at least one nontransitory processor-readable storage medium of the data storage system, a media library which comprises a plurality of media objects, the plurality of media objects comprising at least one geotagged media object and at least one non-geotagged media object, wherein each geotagged media object is logically associated with geolocation information, and each non-geotagged media object is not logically associated with geolocation information;

grouping, by at least one processor communicatively coupled to the at least one nontransitory processor-readable storage medium, at least some of the plurality of media objects in the media library into one or more clusters based at least in part on at least one clustering condition; and for each of the one or more clusters that includes at least one non-geotagged media object, logically associating, by the at least one processor, each of the non-geotagged media objects in the cluster with geolocation information in the at least one nontransitory processor-readable storage medium based at least in part on geolocation information that is logically associated with at least one geotagged media object in the cluster.

2. The method of claim 1 wherein the at least one geotagged media object is logically associated with information indicative of the capture location of the at least one geotagged media object, the information comprising at least one of global positioning system (GPS) data, metadata, keyword data, place name data, file name data, or folder name data.

3. The method claim 1 wherein grouping at least some of the plurality of media objects in the media library into one or more clusters based at least in part on at least one clustering condition comprises grouping at least some of the plurality of media objects in the media library into one or more clusters based at least in part on a capture time of the media objects.

4. The method of claim 1 wherein grouping at least some of the plurality of media objects in the media library into one or more clusters based at least in part on at least one clustering condition comprises grouping at least some of the plurality of media objects in the media library into one or more clusters based at least in part on both a capture time of the media objects and geolocation information of at least one of the geotagged media objects.

5. The method of claim 1, further comprising:

causing, by the at least one processor, at least one of the non-geotagged media objects and the geolocation information logically associated therewith to be presented via a user interface.

6. The method of claim 5, further comprising:

receiving, by the at least one processor, at least one of:

an approval of the logical association between the non-geotagged media object and the geolocation information; or a request for modification of the logical association between the non-geotagged media object and the geolocation information.

7. The method of claim 6, further comprising:

responsive to receiving a request for modification of the logical association, modifying the logical association between the non-geotagged media object and the geolocation information in the at least one nontransitory processor-readable storage medium.

8. The method of claim 5, further comprising:

simultaneously receiving, by the at least one processor, at least one of:

an approval of the logical association between a plurality of the non-geotagged media objects and geolocation information; or a request for modification of the logical association between a plurality of the non-geotagged media objects and geolocation information.

9. The method of claim 1 wherein logically associating each of the non-geotagged media objects with geolocation information in the at least one nontransitory processor-readable storage medium comprises logically associating each of the non-geotagged media objects with geolocation information that is less precise than the geolocation information of at least one of the geotagged media objects.

10. The method of claim 1 wherein logically associating each of the non-geotagged media objects with geolocation information in the at least one nontransitory processor-readable storage medium comprises logically associating each of the non-geotagged media objects with geolocation information that is identical to the geolocation information of at least one of the geotagged media objects.

11. The method of claim 1 wherein logically associating each of the non-geotagged media objects with geolocation information in the at least one nontransitory processor-readable storage medium comprises logically associating each of the non-geotagged media objects with geolocation information indicative of a geographic region comprising at least one of a neighborhood, a city, a state, a multi-state region, a country or a continent.

12. The method of claim 1 wherein logically associating each of the non-geotagged media objects with geolocation information in the at least one nontransitory processor-readable storage medium comprises logically associating each of the non-geotagged media objects with hierarchical geolocation information in the at least one nontransitory processor-readable storage medium based at least in part on geolocation information that is logically associated with at least one geotagged media object in the cluster.

13. The method of claim 1, further comprising:
causing, by the at least one processor, at least one of the one or more clusters to be presented via a user interface in descending levels of precision.

14. The method of claim 13, further comprising:
receiving, by the at least one processor, at least one of:
an approval of the logical association between a non-geotagged media object and geolocation information logically associated with the non-geotagged media object; or
a request for modification of the logical association between a non-geotagged media object and geolocation information logically associated with the non-geotagged media object.

15. The method of claim 13 wherein causing at least one of the one or more clusters to be presented via a user interface in descending levels of precision comprises causing at least one of the one or more clusters to be presented in descending levels of precision comprising least two of: country, state, city, address, and global positioning system (GPS) coordinates.

16. The method of claim 1, further comprising:
causing, by the at least one processor, at least one of the one or more clusters to be graphically presented via a user interface.

17. The method of claim 1 wherein storing a media library which comprises a plurality of media objects comprises storing a media library which comprises a plurality of media objects on at least two nontransitory processor-readable storage media associated with a respective at least two computing devices.

18. The method of claim 1 wherein storing a media library which comprises a plurality of media objects comprises storing a media library which comprises a plurality of media objects comprising one or more media object types selected from the group of media object types consisting of: image media objects, video media objects, and document media objects.

19. The method of claim 1, further comprising:
for a cluster that does not include any geotagged media objects, causing a prompt to be provided via a user interface that receives a selection of a location for the cluster that does not include any geotagged media objects; and
logically associating the selected location with the cluster in at least one nontransitory processor-readable storage medium.

20. The method of claim 19 wherein causing a prompt to be provided via a user interface comprises causing a prompt to be provided that presents at least one location for selection, the at least one location based at least in part on the location information of a media object in a cluster other than the cluster that does not include any geotagged media objects.

21. The method of claim 19 wherein causing a prompt to be provided via a user interface comprises causing a prompt to be provided that presents at least one location for selection, the at least one location based at least in part on the location information of at least one geotagged media object in a cluster proximate in time to the cluster that does not include any geotagged media objects.

22. A data storage system, comprising:
at least one nontransitory processor-readable storage medium which stores processor-executable instructions or data, and which stores a plurality of media objects, the plurality of media objects comprising at least one geotagged media object and at least one non-geotagged media object, wherein each geotagged media object is logically associated with geolocation information, and each non-geotagged media object is not logically associated with geolocation information; and
at least one processor communicably coupled to the at least one nontransitory processor-readable medium, in operation the at least one processor:
groups at least some of the plurality of media objects in the media library into one or more clusters based at least in part on at least one clustering condition; and
for each of the one or more clusters that includes at least one non-geotagged media object, logically associates each of the non-geotagged media objects in the cluster with geolocation information in the at least one nontransitory processor-readable storage medium based at least in part on geolocation information that is logically associated with at least one geotagged media object in the cluster.

23. The data storage system claim 22 wherein the at least one clustering condition comprises a capture time of the media objects.

24. The data storage system of claim 22 wherein the at least one clustering condition comprises both a capture time of the media objects and geolocation information of at least one of the geotagged media objects.

25. The data storage system of claim 22 wherein in operation the at least one processor:
causes at least one of the non-geotagged media objects and the geolocation information logically associated therewith to be presented via a user interface.

26. The data storage system of claim 25 wherein in operation the at least one processor:
receives at least one of:
an approval of the logical association between the non-geotagged media object and the geolocation information; or
a request for modification of the logical association between the non-geotagged media object and the geolocation information.

27. The data storage system of claim 26 wherein, responsive to receiving a request for modification of the logical association, the at least one processor:

modifies the logical association between the non-geotagged media object and the geolocation information in the at least one nontransitory processor-readable storage medium.

28. The data storage system of claim 25 wherein in operation the at least one processor:

simultaneously receives at least one of:
- an approval of the logical association between a plurality of the non-geotagged media objects and geolocation information; or
- a request for modification of the logical association between a plurality of the non-geotagged media objects and geolocation information.

29. The data storage system of claim 22 wherein in operation the at least one processor:

logically associates each of the non-geotagged media objects with geolocation information that is less precise than the geolocation information of at least one of the geotagged media objects.

30. The data storage system of claim 22 wherein in operation the at least one processor:

logically associates each of the non-geotagged media objects with geolocation information that is identical to the geolocation information of at least one of the geotagged media objects.

31. The data storage system of claim 22 wherein in operation the at least one processor:

logically associates each of the non-geotagged media objects with geolocation information indicative of a geographic region comprising at least one of a neighborhood, a city, a county, a state, a multi-state region, a country or a continent.

32. The data storage system of claim 22 wherein in operation the at least one processor:

logically associates each of the non-geotagged media objects with hierarchical geolocation information in the at least one nontransitory processor-readable storage medium based at least in part on geolocation information that is logically associated with at least one geotagged media object in the cluster.

33. The data storage system of claim 22 wherein in operation the at least one processor:

causes at least one of the one or more clusters to be presented via a user interface in descending levels of precision.

34. The data storage system of claim 33 wherein in operation the at least one processor:

receives at least one of:
- an approval of the logical association between a non-geotagged media object and geolocation information logically associated with the non-geotagged media object; or
- a request for modification of the logical association between a non-geotagged media object and geolocation information logically associated with the non-geotagged media object.

35. The data storage system of claim 33 wherein in operation the at least one processor:

causes at least one of the one or more clusters to be presented in descending levels of precision comprising least two of: country, state, city, address, and global positioning system (GPS) coordinates.

36. The data storage system of claim 22 wherein in operation the at least one processor:

causes at least one of the one or more clusters to be graphically presented via a user interface.

37. The data storage system of claim 22 wherein the at least one nontransitory processor-readable storage medium which stores the plurality of media objects comprises at least two nontransitory processor-readable storage media associated with a respective at least two computing devices.

38. The data storage system of claim 22 wherein the plurality of media objects comprise one or more media object types selected from the group of media object types consisting of: image media objects, video media objects, and document media objects.

* * * * *